United States Patent
Tynan, Jr. et al.

(10) Patent No.: US 9,328,268 B2
(45) Date of Patent: *May 3, 2016

(54) PROCESS FOR PREPARING ADHESIVE USING PLANETARY EXTRUDER

(71) Applicant: Intertape Polymer Corp., Sarasota, FL (US)

(72) Inventors: John Kinch Tynan, Jr., Port Huron, MI (US); Richard Walter St. Coeur, Marysville, MI (US); David Michael Kovach, Marysville, MI (US); Thomas Lombardo, Bradenton, FL (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/026,417

(22) Filed: Sep. 13, 2013

(65) Prior Publication Data
US 2014/0011945 A1    Jan. 9, 2014

Related U.S. Application Data

(63) Continuation of application No. 13/337,521, filed on Dec. 27, 2011, now Pat. No. 8,552,084, which is a continuation of application No. 11/702,282, filed on Feb. 5, 2007, now Pat. No. 8,110,612, which is a (Continued)

(51) Int. Cl.
*B05D 1/26* (2006.01)
*B05D 5/10* (2006.01)
(Continued)

(52) U.S. Cl.
CPC .............. *C09J 107/00* (2013.01); *B01F 7/145* (2013.01); *B29B 7/526* (2013.01); *B29B 7/564* (2013.01);
(Continued)

(58) Field of Classification Search
CPC ............ B05D 1/265; B05D 1/26; B05D 5/10; B05D 3/067; B05D 1/28; B05D 2252/02; B05C 5/0254; B05C 11/025; B01F 7/145; B01F 2215/006; B29B 7/56; B29B 7/564; B29B 7/526; B29C 47/42; B29C 47/6043; B29C 47/0021
USPC .......................... 427/207.1, 177, 420, 428.01
See application file for complete search history.

(56) References Cited

U.S. PATENT DOCUMENTS 3,645,980 A    2/1972   Baker et al.
3,914,484 A    10/1975  Creegan et al.
(Continued)

FOREIGN PATENT DOCUMENTS

CA    698518      11/1964
DE    1954214     5/1971
(Continued)

OTHER PUBLICATIONS

JPO computer generated translation and Derwent abstract of JP 2001-115118 A, published Apr. 2001.
(Continued)

*Primary Examiner* — Kirsten Jolley
(74) *Attorney, Agent, or Firm* — Thompson Hine LLP

(57) ABSTRACT

A continuous process for preparing a pressure sensitive adhesive using a planetary roller extruder is described. The continuous process includes introducing at least one non-thermoplastic elastomer into a planetary roller extruder and initially compounding the non-thermoplastic elastomer in the planetary roller extruder to form an initially masticated non-thermoplastic elastomer. Then, a solid raw material, a liquid material, or both are introduced into the initially masticated non-thermoplastic elastomer in the planetary roller extruder, and subsequent compounding of the initially masticated non-thermoplastic elastomer with these additional components occurs to form an adhesive composition.

18 Claims, 5 Drawing Sheets

Related U.S. Application Data continuation of application No. 10/997,827, filed on Nov. 24, 2004, now Pat. No. 7,476,416.

(60) Provisional application No. 60/524,505, filed on Nov. 24, 2003.

(51) Int. Cl.

| | |
|---|---|
| C09J 107/00 | (2006.01) |
| B01F 7/14 | (2006.01) |
| B29B 7/52 | (2006.01) |
| B29C 47/00 | (2006.01) |
| B29C 47/42 | (2006.01) |
| C09J 109/06 | (2006.01) |
| B29C 47/60 | (2006.01) |
| B29B 7/56 | (2006.01) |
| B05C 5/02 | (2006.01) |
| B05C 11/02 | (2006.01) |
| B05C 11/10 | (2006.01) |
| B05D 1/28 | (2006.01) |
| B05D 3/06 | (2006.01) |

(52) U.S. Cl.
CPC ............ *B29C 47/0021* (2013.01); *B29C 47/42* (2013.01); *B29C 47/6043* (2013.01); *C09J 109/06* (2013.01); *B01F 2215/006* (2013.01); *B01F 2215/0049* (2013.01); *B05C 5/0262* (2013.01); *B05C 11/025* (2013.01); *B05C 11/10* (2013.01); *B05D 1/26* (2013.01); *B05D 1/265* (2013.01); *B05D 1/28* (2013.01); *B05D 3/067* (2013.01); *B05D 3/068* (2013.01); *B05D 5/10* (2013.01); *B05D 2252/02* (2013.01); *B29B 7/56* (2013.01); *Y10T 428/2813* (2015.01); *Y10T 428/2852* (2015.01); *Y10T 428/2857* (2015.01); *Y10T 428/2878* (2015.01); *Y10T 428/2883* (2015.01)

(56) References Cited

U.S. PATENT DOCUMENTS

| | | | |
|---|---|---|---|
| 3,941,535 | A | 3/1976 | Street |
| 4,404,324 | A | 9/1983 | Fock et al. |
| 4,889,430 | A | 12/1989 | Mueller |
| 5,162,457 | A | 11/1992 | Hänsel et al. |
| 5,198,064 | A | 3/1993 | Tani et al. |
| 5,239,017 | A | 8/1993 | Pelesko et al. |
| 5,536,462 | A | 7/1996 | Hawrylko |
| 5,539,033 | A | 7/1996 | Bredahl et al. |
| 5,550,175 | A | 8/1996 | Bredahl et al. |
| 5,605,720 | A | 2/1997 | Allen et al. |
| 5,760,135 | A | 6/1998 | Korpman et al. |
| 5,776,998 | A | 7/1998 | Southwick et al. |
| 5,849,145 | A | 12/1998 | Tornetti |
| 5,858,150 | A | 1/1999 | Yarusso et al. |
| 5,866,249 | A | 2/1999 | Yarusso et al. |
| 5,910,542 | A | 6/1999 | St. Clair et al. |
| 5,914,157 | A | 6/1999 | Munson et al. |
| 6,150,017 | A | 11/2000 | Burmeister et al. |
| 6,166,110 | A | 12/2000 | Bredahl et al. |
| 6,179,458 | B1 | 1/2001 | Albers et al. |
| 6,221,965 | B1 | 4/2001 | Gräbner et al. |
| 6,251,517 | B1 | 6/2001 | Sashihara et al. |
| 6,506,447 | B1 | 1/2003 | Hirsch et al. |
| 6,527,899 | B1 | 3/2003 | Dietz et al. |
| 6,613,381 | B1 | 9/2003 | Bredahl et al. |
| 6,759,122 | B2 | 7/2004 | Spies et al. |
| 6,780,271 | B1 | 8/2004 | Burmeister et al. |
| 6,799,881 | B2 | 10/2004 | Fischer |
| 6,822,029 | B1 | 11/2004 | Burmeister et al. |
| 6,822,048 | B1 | 11/2004 | Burmeister et al. |
| 6,881,796 | B2 | 4/2005 | Yamaguchi et al. |
| 8,110,612 | B2 | 2/2012 | Tynan et al. |
| 2001/0039302 | A1 | 11/2001 | Wustling et al. |
| 2002/0193459 | A1 | 12/2002 | Haseyama et al. |
| 2003/0032691 | A1 | 2/2003 | Bolte et al. |
| 2004/0228972 | A1 | 11/2004 | Pekurovsky et al. |
| 2005/0004287 | A1 | 1/2005 | Burmeister et al. |
| 2005/0014879 | A1 | 1/2005 | Moroishi et al. |
| 2005/0165164 | A1 | 7/2005 | Moeller et al. |

FOREIGN PATENT DOCUMENTS

| | | |
|---|---|---|
| DE | 3133647 | 3/1983 |
| DE | 3908415 | 9/1990 |
| DE | 19653790 | 6/1998 |
| DE | 19721808 | 11/1998 |
| DE | 19939075 | 2/2001 |
| DE | 19939077 | 2/2001 |
| EP | 1077244 | 2/2001 |
| JP | 3017176 | 1/1991 |
| JP | 10-235713 | 9/1998 |
| JP | 11-080690 | 3/1999 |
| JP | 11-216764 | 8/1999 |
| JP | 11-216764 | 10/1999 |
| JP | 2001-115118 | 4/2001 |
| WO | 94/11175 | 5/1994 |
| WO | 99/42276 | 8/1999 |
| WO | 2004/037941 | 5/2004 |

OTHER PUBLICATIONS

Angier, D.J. et al., "Mastication of Rubber. VI. Viscosity and Molecular Weight Relationships for Natural Rubber After Cold Mastication," *Journal of Polymer Science*, vol. XXV, pp. 129-138 (1957).

Rauwendaal, C., "The Multiscrew Extruder With More Than Two Screws," *Polymer Extrusion*, Hanser Publishers, pp. 31-32 (1986).

Author Anonymous, "Adhesive Compounding Process for Production of Pressure Sensitive Tapes," published at www.researchdisclosure.com (Oct. 31, 2003).

"Planetary Extruder," by Lanhang Machinery Co., Ltd., on web page allproduct.com (date of first publication unknown).

"Rubber—The Tailor-Made Material. Compounding of Elastomer Masses in a Planetary Roller Extruder." by ENTEX (17 pages) (alleged to be Jan. 2003).

Office Action, U.S. Appl. No. 10/997,827 (Mar. 17, 2008).

Notice of Allowance, U.S. Appl. No. 10/997,827 (Sep. 22, 2008).

Restriction Requirements, U.S. Appl. No. 11/702,282 (Jul. 10, 2009).

Office Action, U.S. Appl. No. 11/702,282 (Dec. 11, 2009).

Office Action, U.S. Appl. No. 11/702,282 (Jun. 25, 2010).

Office Action, U.S. Appl. No. 11/702,282 (Dec. 8, 2010).

Office Action, U.S. Appl. No. 11/702,282 (Apr. 1, 2011).

Notice of Allowance, U.S. Appl. No. 11/702,282 (Oct. 24, 2011).

Supplemental Notice of Allowability, U.S. Appl. No. 11/702,282 (Nov. 9, 2011).

Supplemental Notice of Allowability, U.S. Appl. No. 11/702,282 (Dec. 13, 2011).

EP, Supplementary European Search Report, European Application No. 04817898.2 (Sep. 29, 2011).

Office Action (with English translation), Japanese Patent Application No. 2006-517863 (Aug. 21, 2009).

Office Action (Restriction Requirement), U.S. Appl. No. 13/337,521 (Sep. 5, 2012).

Office Action, U.S. Appl. No. 13/337,521 (Dec. 13, 2012).

Notice of Allowance, U.S. Appl. No. 13/337,521 (Jun. 7, 2013).

EP, Search Report, European Application No. 14150040.5 (Jun. 4, 2014).

EP, Communication pursuant to Article 94(3) EPC; Patent Application No. 14150040.5 (Oct. 5, 2015).

PROCESS FOR PREPARING ADHESIVE USING PLANETARY EXTRUDER

REFERENCE TO RELATED APPLICATION

This application is a continuation of U.S. application Ser. No. 13/337,521, filed Dec. 27, 2011, which is a continuation of U.S. application Ser. No. 11/702,282, filed Feb. 5, 2007, now U.S. Pat. No. 8,110,612, which is a continuation of U.S. application Ser. No. 10/997,827, filed Nov. 24, 2004, now U.S. Pat. No. 7,476,416, which claims the benefit of U.S. Provisional Application No. 60/524,505.

FIELD OF THE INVENTION

The present invention relates to a continuous, low-temperature process for the mastication and compounding of non-thermoplastic elastomers with tackifying resins and may include one or more of the following: thermoplastic elastomers, extenders, plasticizers and oils, activators, anti-degradants, crosslinking agents, colorants, solvents, and foaming agents. In one aspect of the invention, the adhesive may be applied directly to a web-form material.

The general purpose of the invention is to provide a method for producing a self adhesive composition by mastication of non-thermoplastic elastomers in a planetary roller extruder (PRE). In one embodiment mastication is achieved through the use of double transversal or "back-cut" planetary spindles, in combination with full-flight planetary spindles to produce an adhesive that can be applied to a web-form material using a slot die.

BACKGROUND OF THE INVENTION

Pressure sensitive adhesive compositions are blends of several raw materials including elastomers, resins, plasticizers and other additives such as antioxidants, fillers, pigments, etc. Since these ingredients must be blended in the proper ratio to obtain the adhesive having the desired properties, the raw materials are typically blended with a mechanical mixer under controlled conditions as part of a batch-wise process to obtain a thoroughly mixed product having the appropriate relative amounts of the raw materials.

Planetary roll extruders have been known and have typically been used in processing of thermoplastics such as PVC, for example, where they were used primarily to supply the downstream units such as, for example, calenders or roll mills. Planetary roll extruders have typically been used to process heat-sensitive compounds with a minimum of degradation because thin layers of compound can be exposed to large surface areas thereby resulting in effective heat exchange, mixing and temperature control. Planetary roll extruders are available in various designs and sizes. The diameters of the roll cylinders, depending on the desired throughput, are typically between 70 mm and 500 mm.

Planetary roll extruders generally have a filling section and a compounding section. The filling section typically includes a conveying screw to which certain raw materials are fed continuously. The conveying screw then passes the material to the compounding section. The compounding section includes a driven main spindle and a number of planetary spindles which rotate around the main spindle within a roll cylinder with internal helical gearing. The rotary speed of the main spindle and hence the rotational speed of the planetary spindles can be varied and is one parameter to be controlled during the compounding process. The materials are circulated between the main and planetary spindles, or between the planetary spindles and the helical gearing of the roll section, so that under the materials are dispersed to form a homogeneous composition.

The number of planetary spindles rotating in each roll cylinder can be varied and thus adapted to the requirements of the process. The number of spindles influences the free volume within the planetary roll extruder, the residence time of the material in the process, and also determines the surface area for heat and material exchange. By way of the dispersive energy introduced, the number of planetary spindles has an influence on the result of compounding. Given a constant diameter of roll cylinder, a larger number of spindles permit better homogenization and dispersion or, respectively, a greater product throughput.

The maximum number of planetary spindles installable between the main spindle and the roll cylinder depends on the diameter of the roll cylinder and on the diameter of the planetary spindles used. When using relatively large roll diameters, as required for obtaining production-scale throughputs, and/or relatively small diameters for the planetary spindles, the roll cylinders can be equipped with a relatively large number of planetary spindles. With a roll diameter of D=70 mm, typically up to seven planetary spindles are used, whereas with a roll diameter of D=200 mm ten, for example, and a roll diameter of D=400 mm 24 for example, planetary spindles can be used. However, these examples are in no way limiting to those skilled in the art. For example, if the diameter of the main spindle is smaller relative to a larger main spindle, the number of planetary spindles can be increased.

SUMMARY OF THE INVENTION

The present invention is directed to a process for preparing an adhesive using a modified planetary roller extruder. The process in accordance with one aspect of the invention includes introducing primary raw materials including a non-thermoplastic elastomer into a feeding section of the modified planetary roller extruder, conveying the raw materials from the feeding section to a compounding section of the modified planetary roller extruder, mixing the primary raw materials in the compounding section, producing a homogeneous adhesive composition and applying the adhesive composition to a web-form material. The compounding section of the modified planetary roller extruder includes a main spindle surrounded by and intermeshed with a plurality of planetary spindles at least one of which is a double transversal mixing spindle having a plurality of back-cut helical flights.

In accordance with another aspect of the invention, the modified planetary roller extruder is used to produce an adhesive composition. The process in accordance with this aspect of the invention includes continuously metering into a planetary roller extruder primary raw materials of an adhesive composition comprising a non-thermoplastic elastomer and a tackifying resin, continuously mixing the raw materials in a compounding section of the planetary roller extruder to form a homogeneous adhesive composition wherein the compounding section includes a main spindle surrounded by and intermeshed with a plurality of planetary spindles wherein at least one of the planetary spindles is a double transversal mixing spindle having a plurality of back-cut helical flights, and continuously discharging the homogeneous adhesive composition from the extruder. In accordance with certain embodiments, the self-adhesive composition may be applied to a web-formed material using an applicator unit such as a slot-die applicator unit and subsequently crosslinked.

In accordance with another aspect of the invention, the elastomer is masticated such that $M_w$ is reduced to less than 1,000,000 as measured by GPC. In other aspects of the invention, the elastomer may be masticated to cause a reduction in $M_w$ of more than about 50%, more particularly more than about 80%, relative to the original $M_w$ for the elastomer.

BRIEF DESCRIPTION OF THE DRAWINGS

An exemplary embodiment of the invention is explained in more detail below with reference to the drawings in which.

DETAILED DESCRIPTION OF THE INVENTION

All documents cited are, in relevant part, incorporated herein by reference; the citation of any document is not to be construed as an admission that it is prior art with respect to the present invention.

Figure 1:
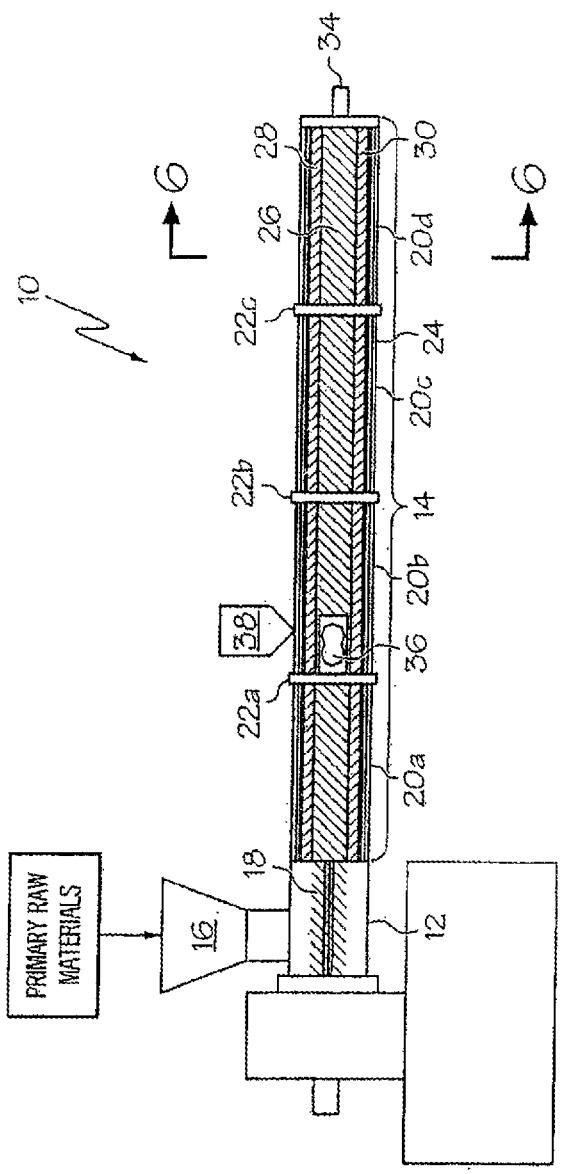
FIG. 1 is a longitudinal sectional view of a planetary roller extruder in accordance with one aspect of the present invention.

Turning now to the drawings, and referring initially to FIG. 1, a planetary roller extruder in accordance with one embodiment of the present invention is illustrated and generally designated by the reference 10. It will be appreciated that the planetary roller extruder system 10 is illustrated in diagrammatic form in order to explain its operation in easily understandable manner. However, in actual practice, the shape and size of the system 10 might be substantially different from that illustrated and yet still be within the scope of the claims set forth herein.

The planetary roller extruder system 10 includes a feeding section 12 and a compounding section 14. The primary adhesive raw materials are added into the feed throat 16 and metered onto the conveying screw 18 of the filling section 12. As used herein, the term "primary raw materials" refers to those materials of the adhesive formulation added into the feed section 12 of the planetary roller extruder 10. Primary raw materials may include, but are not limited to, elastomers, resins, extenders, activators, anti-degradents, and crosslinking agents. The screw 18 conveys the primary raw materials into the compounding section 14. The compounding section 14, as illustrated in FIG. 1, includes four planetary roller barrel sections 20a, 20b, 20c and 20d separated by dosing rings 22a, 22b and 22c. Each roller barrel section 20 includes a 45° helical toothed cylinder 24, a 45° helical toothed main spindle 26 and a plurality of 45° helical toothed planetary spindles 28, 30. The helical gearing can have any suitable angle, for example, an angle of 10 to 60°, more particularly somewhat greater than 20° may be useful. In accordance with the certain aspects of the present invention, at least one of the roller barrel sections 20 includes a double transversal planetary spindle 28. The present invention is not limited to the use of double transversal planetary spindles. Other spindle configurations that provide the desired levels of mixing can also be used.

The maximum number of planetary spindles 28, 30 is a function of the diameter of the main spindle 26 and the helical toothed cylinder 24. The planetary spindles 28, 30 can exhibit many different tooth geometries, e.g., full helical flights (Planetspindel) 30, double transversal helical flights (also known as back-cut spindles or Noppenspindel) 28, or zoned helical flights (Igelspindel), etc. The number of planetary spindles chosen and their geometries (e.g., open vs. full flight) can be manipulated in such a way as to influence the dynamic discharging effect of each roller barrel section 20 and the discharging differential between sections. Additionally, the gap between the dosing ring 22 and the main spindle 26 can be changed to vary the dynamic discharging effect of each barrel section 20 and the discharging differential between the barrel sections 20.

A standard planetary spindle 30 is represented by a cylinder in which grooves or flights have been cut at 45° angles to the spindle axis, the same angle as the main spindle flights. The planetary spindles ride in the main spindle flights and this design yields identical surface speeds of the planetary spindles 28, 30 and the main spindle 26. There is a gap between the main and planetary spindles which is filled with process material and the net result is that near zero-shear distributive and dispersive mixing can occur between the main spindle 26, the planetary spindles 28, 30, and the barrel wall 24.

Another net result of the 45° angle cut into the planetary and main spindles is a positive pressure, a forwarding motion imparted on the process material. A variation which yields less pressure, more slippage, less forwarding motion, longer residence time and hence greater mixing is the use of or double transversal spindles 28 (also known as noppenspindles or back-cut spindles).

Figure 2:
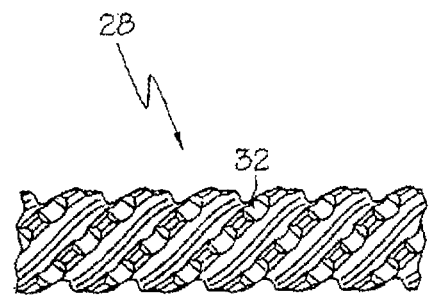
FIG. 2 is an enlarged view of an exemplary double transversal mixing spindle.

Double transversal planetary spindles 28 are spindles having openings in the flights that permit material to pass between the wall of the barrel 24 and the main spindle 26 and slow the rate with which material passes through the planetary roller extruder system 10. One example of a double transversal spindle 28 is a so-called porcupine spindle. A particular example of a double transversal spindle 28 is shown in detail in FIG. 2, back cut openings 32 increase residence time and improve mixing. The design of a double transversal spindle 28 is a variation of the standard planetary spindle, with the addition of channels cut into the 45° angled flights. The angle of these back cut channels can range from about 45-135° relative to the spindle flights, more particularly from about 75-105°, and in accordance with certain aspects of the invention the back cut channels may be at an angle of about 90°. The number and depth of these channels may also be varied and can be defined in more simplistic terms by the following: [(total channel area cut into the spindle flights/total area of spindle flights)×100%]. This value may range from about 10-90%, more particularly from about 40-60%, and in certain embodiments of the invention the value may be about 50%. Planetary roller extruders having double transversal spindles 28 are commercially available from Rust-Mitschke-Entex. By adjusting the number of full flight 30 and open or double transversal spindles 28, the rate with which material passes through the planetary roller extruder and hence the amount of mastication that is done on the material can be controlled.

Figure 6:
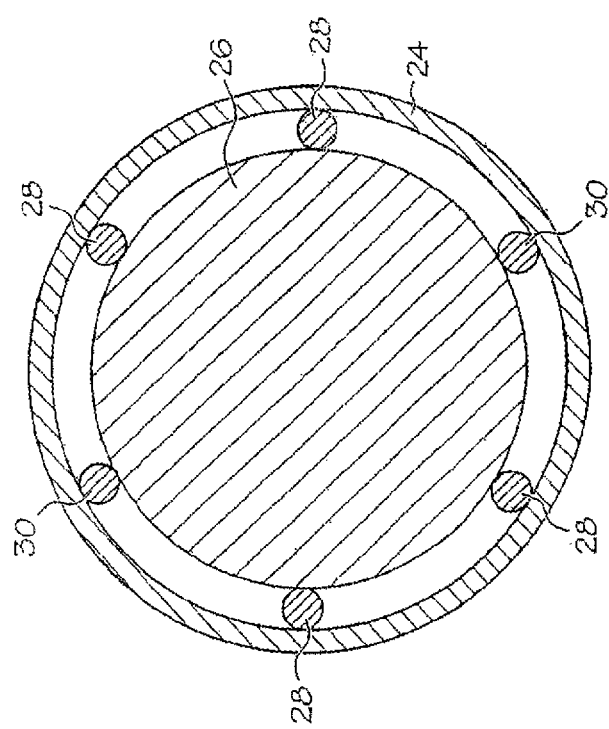
FIG. 6 is a cross-sectional view of the planetary roller extruder in FIG. 1 along line 6-6.

Conventional planetary roller extruders contain at least 3 and can contain up to 24 spindles depending on the diameter of the cylinder and process design. Of course, one of skill in the art would realize that a greater number of planetary spindles could be used depending on the specific dimensions and construction of the extruder. In one embodiment of the invention, a planetary roller extruder 10 having a 70 mm diameter cylinder having 6 spindles 28, 30 is used. In accordance with certain aspects of the invention, the double transversal spindles 28 account for more than 20%, more particularly more than 50%, of the number of planetary spindles 28, 30 in the planetary roller extruder 10. FIG. 6 shows a cross-section for a planetary extruder in accordance with a particular embodiment of the invention that includes four (4) double transversal planetary spindles 28 and two (2) full flight spindles 30.

The rotation of the main spindle 26 causes the planetary spindles 28, 30 to be set in rotational movement, as a result of the helical gearing of the main spindle 26 interacting with the helical gearing of the planetary spindles 28, 30.

The planetary spindles 28, 30 also mesh with the internal gearing of the cylinder section 24. The helical gearing of the main spindle 26, the planetary spindles 28, 30 and the cylinder section 24 conveys the raw materials to be compounded in the direction of the discharge orifice 34.

Figure 3:
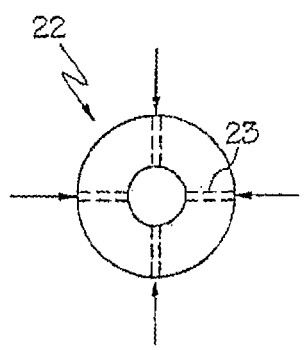
FIG. 3 is a cross-sectional view of a dosing ring from the planetary roller extruder in FIG. 1.

The term "secondary raw materials" as used herein refers to raw materials or solvents introduced into the compounding section 14 of the planetary roller extruder 10. Secondary liquid materials, such as liquid elastomers, molten resins, oils, solvents, etc., can be introduced into the compounding section 14 via injection nozzles (not shown) through the dosing ring 22 assemblies. As shown in FIG. 3, the dosing rings 22 include radially extending bores 23 that allow for metered addition of liquids to the compounding section 14. In accordance with one embodiment of the invention, the process involves the feeding of solvent into the compounding section 14 of the planetary roller extruder 10 via the dosing rings 22.

Secondary solid raw materials can be added to the compounding section 14 through a side feeder 36 or twin screw dosing units 38. The twin screw dosing units 38 are typically positioned perpendicular to the axis of the compounding section 14 and are typically located near the beginning of the compounding section directly adjacent to the dosing ring 22*a*. The twin screw dosing units 38 can be employed to introduce solid components such as thermoplastic elastomers, resins, extenders, activators, anti-degradents, crosslinkers, etc., to the individual roller barrel sections 20.

Figure 4:
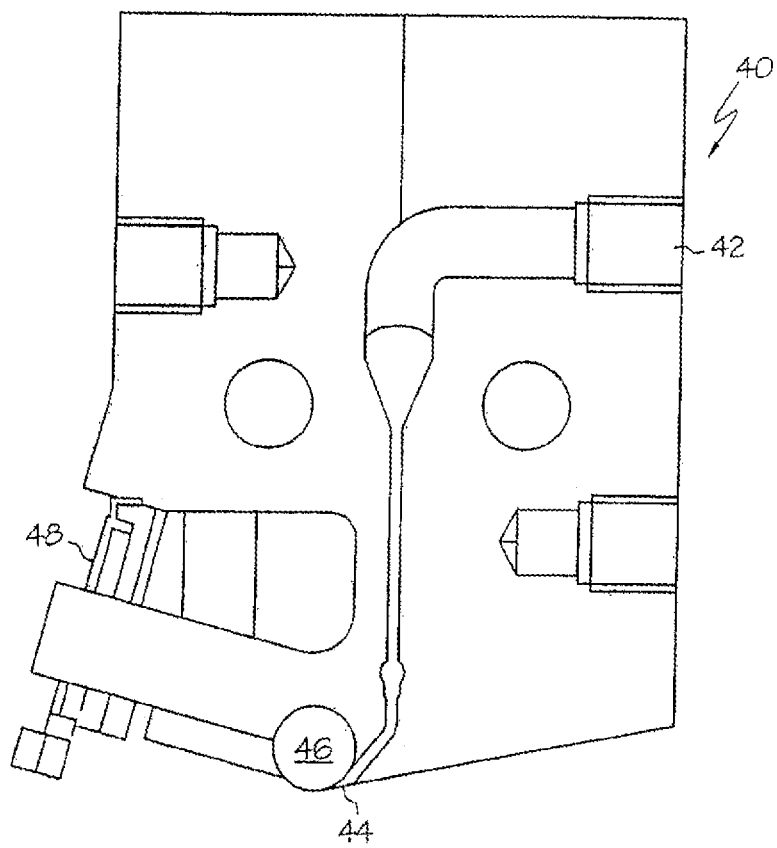
FIG. 4 is cross-sectional view of a slot die coater.
Figure 5:
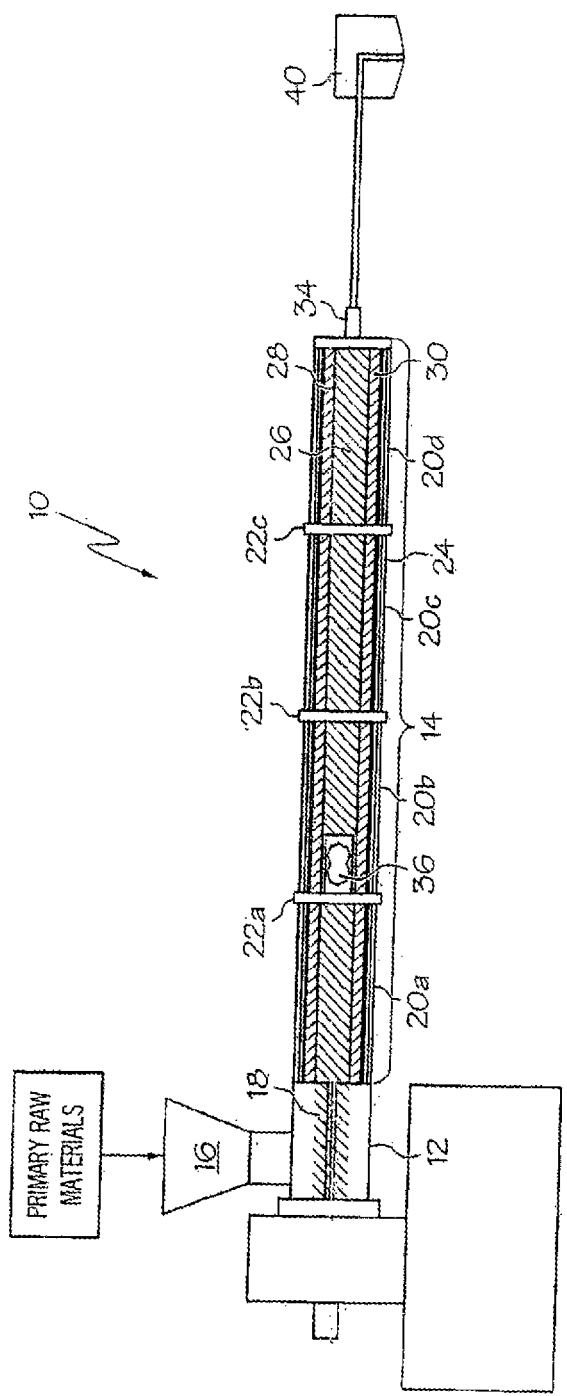
FIG. 5 is a longitudinal sectional view of a planetary roller extruder and slot die coater in accordance with one aspect of the present invention.

Another embodiment of the invention involves coating the self-adhesive composition on a web-form material, where the coating of the web-form material may be carried out using any of a variety of coating techniques including, but not limited to, slot-die coating, roll-over-roll coating, reverse roll and knife-over-roll coating. In accordance with certain embodiments of the present invention, the adhesive composition is applied to the web-form material using a slot-die applicator unit. Particularly useful methods for applying the adhesive composition to the web-form material include slot-die coating using a rotating lip die or a fixed lip contact die. One particular slot die unit that can be used is a rotating lip die having a spindle that trails the die lip. One example of such a die is commercially available from SIMPLAS and is shown in FIG. 4. Rotating lip die 40 includes an inlet 42 for receiving the adhesive composition from the extruder 10. As shown in FIG. 5, the adhesive composition is continuously conveyed from the extruder 10 to the rotating lip die applicator 40 to be applied to a web-form material through slot 44. The rotating lip die applicator 40 further includes a rotating spindle 46 at the trailing edge of the die lip that improves coating properties of the applied adhesive. Adjustable bolts 48 on the rotating lip die applicator 40 enable the operator to easily adjust the lip opening and control the adhesive coating thickness.

In accordance with another aspect of the present invention, the self-adhesive composition may be crosslinked. More specifically the coated adhesive composition may be crosslinked with the aid of electron beams or UV rays by means of ionizing radiation, such as electron beams, for example, so that the resultant self-adhesive tape becomes shear-resistant and temperature-stable. UV rays as well can be used for crosslinking, in which case appropriate UV promoters, for example such as Ebecryl 140 from UCB, must be added to the self-adhesive composition. Chemical and/or thermally induced crosslinking may also be used.

The non-thermoplastic elastomer may be chosen from the group of the natural rubbers or of the synthetic rubbers or of any desired blend of natural rubbers and/or synthetic rubbers, it being possible to choose the natural rubber or rubbers in principle from all available grades, such as, for example, crepe, RSS, ADS, TSR, SIR 10, SIR 5L or CV grades, depending on the required purity and viscosity level, and it being possible to choose the synthetic rubber or rubbers from the group of the randomly copolymerized styrene-butadiene rubbers (SBR), butadiene rubbers (BR), synthetic polyisoprenes (IR), butyl rubbers (IIR), polyisobutylene rubber, halogenated butyl rubbers (XIIR), acrylate rubbers (ACM), ethylene vinyl acetate copolymers (EVA) and polyurethanes, and/or blends thereof.

Thermoplastic elastomers with a weight fraction of from 1 to 100% by weight, based on the total non-thermoplastic elastomer content, can be added to the non-thermoplastic elastomers. As representatives, mention may be made at this point in particular of the highly compatible styrene-isoprene-styrene (SIS), styrene-butadiene-styrene (SBS), styrene isoprene butadiene styrene (SIBS) grades as well as SEBS, and SEPS, and any combination thereof.

Tackifier resins which can be used are, without exception, all tackifier resins that can function as tackifiers in the formulation. Tackifier resins may be present in the adhesive composition at from 40% to 200% weight fraction based on elastomer. Representatives that may be mentioned include the rosins, their disproportionated, hydrogenated, polymerized and esterified derivatives and salts, the aliphatic and aromatic hydrocarbon resins, terpene resins and terpene-phenolic resins. Typical resins include partially or fully hydrogenated wood, gum, or tall oil rosins, esterified wood, gum or tall oil rosins, alpha and beta pinene resins, and polyterpene resins. More specifically, resins useful herein include C5 hydrocarbon resins, C9 hydrocarbon resins and mixtures thereof. Coumarone indene and alpha-methyl styrene resins can also be used. The resins can be introduced in both solid and molten form. Any desired combinations of these and other resins can be used in order to adjust the properties of the resultant adhesive composition in accordance with what is desired. Reference may be made expressly to the depiction of the state of knowledge in "Handbook of Pressure Sensitive Adhesive Technology" by Donatas Satas (van Nostrand, 1989).

Typical extenders include clays, calcium carbonate, talc, and aluminum hydrates. Typical activators include zinc oxide, zinc chloride, magnesium chloride and magnesium oxide. Typical anti-degradents include antioxidants (AO), ultraviolet absorbers (UVA), and ultraviolet stabilizers (UVS). Typical opacifiers and colorants include, but are not limited to, titanium dioxide and other various metal pigments known to those skilled in the art.

Typical solvents are non-polar aromatics and aliphatics such as acetone, toluene, hexane, heptane, and blends thereof. When a highly foamed adhesive is desired, the solvent content of the adhesive may be increased. This aspect of the disclosure overcomes the problems typically encountered with typical hot melt adhesives that experience problems caused by the higher densities and smooth, non-extensible surfaces of extruded adhesives which result in a low ratio of tack to adhesion in the finished adhesive. Solvents, when present in the formulation, may be used in any amounts up to about 70%, more particularly up to about 50%, by weight of the adhesive composition. Typical liquid elastomers are low molecular weight natural rubber and low molecular weight synthetic polyisoprene and polybutene rubbers. Typical oils can be paraffinic, isoparaffinic, napthenic, aromatic, or polyaromatic. Examples of foaming agents include Cellogen foaming agents and gases.

Plasticizers which can be used are all plasticizing substances known from adhesive tape technology. Examples of useful plasticizers include, but are not limited to, the paraffinic and naphthenic oils, (functionalized) oligomers such as oligobutadienes and oligoisoprenes, liquid nitrile rubbers, liquid terpene resins, animal and vegetable oils and fats, phthalates, and functionalized acrylates.

Simply stated, some advantages of certain embodiments of the new invention/method include; 1) purposeful, effective, and efficient mastication of non-thermoplastic elastomers, 2) the introduction of various solid raw materials into the compounding section, 3) the introduction of solvent into the compounding section, and 4) the use of slot-die coating technology to achieve an adhesive coated web-form material with a unique balance of converged panel adhesion and quick stick properties.

The purposeful mastication of non-thermoplastic elastomers is accomplished as the elastomers are forced with the single-screw from the feeding section between the dosing ring and the main spindles into the compounding section, where it is intensively mixed and subsequently masticated. The degree of mastication is further enhanced through the use of double transversal planetary spindles. Another factor that affects the amount of mastication is the internal diameter of the stop ring. By narrowing the gap between the stop ring or dosing ring and the spindle, more mastication can be performed. Mastication of the non-thermoplastic elastomer translates into more efficient compounding of the elastomer with other solid and liquid materials, yields the potential for a greater ratio of tack to adhesion in the finished adhesive and yields a finished adhesive with lower viscosity that is not limited to being coated via a multiple roll applicator unit (calender). This provides an opportunity to employ more-prevalent, or existing coating equipment, as opposed to purchasing a multiple-roll coating unit.

In accordance with one aspect of the invention, the elastomer is masticated such that $M_w$ is reduced to less than 1,000,000 as measured by GPC. In other aspects of the invention, the elastomer may be masticated to cause a reduction in $M_w$ of more than about 50%, more particularly more than about 80%, relative to the initial $M_w$ for the elastomer. The initial molecular weight refers to the molecular weight of the non-thermoplastic elastomer as it is being introduced into the planetary roller extruder. As such, the initial molecular weight may already have been reduced as a result of preprocessing of the elastomer as compared to the molecular weight for the unprocessed elastomer. Therefore, the reduction in molecular weight referred to herein is based on the reduction in molecular weight obtained by processing on the planetary roller extruder. The reduction in molecular weight as described herein is calculated by Formula I:

$$\% \text{ Reduction} = (M_{w(initial)} - M_{w(final)})/M_{w(initial)} \times 100 \quad (I)$$

The introduction of various solid raw materials into the compounding sections has several advantages. First, all solid materials do not have to be introduced all at once in the feeding section of the planetary roller extruder, i.e., they can be dosed in one or more of the roller barrel sections of the compounding section. This gives the elastomer more time to be masticated prior to the addition of solid raw materials and increases the mixing efficiency of the planetary roller extruder. Second, solid resin, as opposed to molten resin can be introduced into the compounding section. The solid resin has a viscosity that more closely resembles the elastomer, when compared to molten resin. As a consequence, the addition of solid (as contrasted with liquid) resin further enhances mixing efficiency, whereas molten resin tends to act as a lubricant and retards mixing efficiency. Additionally, the solid resin has a specific heat which affords it the ability to act as a heat sink, i.e. take heat away from the process, thereby minimizing the temperature of the melt during the compounding process. Conversely, molten resin increases the temperature of the melt in the compounding process.

The introduction of solvent into the compounding sections has several advantages. First, small amounts (e.g., typically 10 to 20% by weight but amounts up to 50% could feasibly be used) of solvent, introduced to the adhesive through several dosing rings, enhances mixing efficiency, i.e. maintains homogeneity, while significantly lowering the viscosity of the finished adhesive. The solvent is readily absorbed by the adhesive composition and the incorporation of solvent lowers the resultant homogeneous adhesive's viscosity to the point that its application to a web-form material is not restricted to a multi-roll applicator unit (calender). Rather, the lower-viscosity adhesive can now be applied to web-form material via slot-die, reverse roll, roll-over-roll, knife-over-roll, or any number of traditional adhesive application techniques including the use of multi-roll applicators. The subsequent liberation of the solvent from the adhesive that has been applied to the web-form material affords the ability to affect numerous adhesive surface geometry profiles, i.e. degrees of foaming, in the adhesive film. Subsequently, the performance properties of the adhesive film can be further manipulated, i.e. in addition to degree of elastomer mastication and formulation.

The use of a slot-die for coating adhesives to web-form material has particular advantages over a multi roll applicator unit (calender). Web-form adhesive coating speeds, when employing multi roll applicator units (calenders), are typically limited to 300 meters per minute. However, the use of slot-die coating technology, particularly when employed in conjunction with lower-viscosity, high-solids adhesives, e.g. 80-90%, as opposed to higher-viscosity, 100% solids adhesives, is of particular interest, as application speeds easily approach 500 meters per minute or more.

The process of the invention permits the production of high-performance self-adhesive compositions and, especially in conjunction with a downstream coating and crosslinking unit, permits the production of high-performance self-adhesive tapes accompanied by particular cost advantages.

In the first process step, a composition comprising the elastomers and the known adjuvants required for the production of self-adhesive compositions, such as extenders, antioxidants, activators, colorants, ageing inhibitors, plasticizers and tackifier resins, is produced in a planetary roll extruder, the composition having a final temperature of less than 150° C., typically less than 130° C. and, more particularly, between about 25° C. and 100° C. The overall residence time of the composition in the planetary roll extruder will typically not exceed about three minutes.

In accordance with certain aspects of the invention, the adhesive formulation from the extruder is applied to a web-form material. This can be done in a particularly effective and advantageous manner using a slot-die applicator unit, especially using a rotating lip slot-die applicator unit similar to that shown in FIG. 4.

In accordance with another aspect of the present invention, the self-adhesive composition may be crosslinked using electron beams or UV rays to provide a self-adhesive tape having the desired properties. For further improved performance, or in the case of Electron Beam (EBC)-sensitive carriers, crosslinking can also be carried out by means of heat-activatable crosslinkers under the effect of temperature. The heating of the pressure-sensitive adhesive composition that is required for this purpose can be done with the aid of the known techniques, especially with the aid of high-temperature ducts, or else with the aid of infrared lamps, or by means of high-frequency magnetic alternating fields, examples being HF waves, UHF waves or microwaves.

Crosslinking of the pressure-sensitive adhesive composition can be carried out, furthermore, by means of a combination of ionizing radiation and heat-activatable chemical crosslinkers. The result may be a highly shear-resistant pressure-sensitive self-adhesive composition. EB curing sets the adhesive so that it can be converted while having a residual latent heat-activatable curing agent available for end use application.

For the purpose of heat-induced and/or chemical crosslinking, it is possible in the process of the invention to use all known heat-activatable and/or chemical crosslinkers, such as accelerated sulphur or sulphur donor systems, isocyanate systems, reactive melamine resins, formaldehyde resins and (optionally halogenated) phenol-formaldehyde resins and/or reactive phenolic resins or diisocyanate crosslinking systems with the corresponding activators, epoxidized polyester resins and acrylate resins, and combinations thereof.

The crosslinkers are preferably activated at temperatures above 50° C., in particular at temperatures from 100° C. to 160° C. and, in accordance with certain embodiments, at temperatures from 110° C. to 140° C. The thermal excitation of the crosslinkers can also be effected by means of IR rays or high-energy alternating fields. Some crosslinkers may remain in the composition after curing and, therefore, be available for activation during the end use application.

Further embraced by the concept of the invention is a self-adhesive tape produced with the aid of the pressure-sensitive adhesive composition by applying the self-adhesive composition to at least one side of a material in web form. Depending on the intended use of the adhesive tape, suitable web-form carrier materials for the self-adhesive compositions processed and produced in accordance with the invention are all known carriers, with or without appropriate chemical or physical surface pretreatment of the coating side, and anti-adhesive physical treatment or coating of the reverse side. Mention may be made, for example, of creped and non-creped papers, polyethylene, polypropylene and mono- or biaxially oriented polypropylene films, polyester, PVC and other films, foam materials in web form, made from polyethylene and polyurethane, for example, wovens, knits and nonwovens. Finally, the web-form material can be a material with an antiadhesive coating on both sides, such as release papers or release films.

The thickness of the self-adhesive composition on the web-form material can be between 10 μm and 2000 μm, preferably between 15 μm and 150 μm. Finally, the self-adhesive composition can be applied in a thickness of from 800 μm to 1200 μm on a release paper. An adhesive-composition layer of this kind, especially after crosslinking, can be used diversely as a backing-less double-sided self-adhesive tape.

The following examples illustrate aspects of the invention, without intending to be limiting thereof. It will be appreciated that other modifications of the present invention, within the skill of those in the art, can be undertaken without departing from the spirit and scope of this invention.

EXAMPLES

Example 1

|  | Ground Natural Rubber | Ground Rubber Adhesive |
|---|---|---|
| Rubber (Kg/hr) | N/A | 17.1 |
| Resin (Kg/hr) | N/A | 22.2 |
| TiO$_2$ + antioxidant (Kg/hr) | N/A | 0.7 |
| Screw Speed (rpm) | N/A | 70 |
| Adhesive temp, between barrel cylinder 1&2 | N/A | 72° C. |
| Adhesive temp, between barrel cylinder 2&3 | N/A | 52° C. |
| Adhesive outlet temperature | N/A | 86° C. |
| Extruder Residence Time (s) |  | 90 |
| Adhesive homogeneity |  | No gels |
| Mw (GPC) | 4,136,110 | 802,748 |
| Percent Drop in Mw |  | 80.6% |
| Mw (ThFFF) | 3,724,000 | 691,000 |
| Percent Drop in Mw |  | 81.5% |

A standard carton sealing adhesive was produced with the PRE having three barrel cylinders, represented by 100 phr natural rubber, 130 phr C5 resin, 2 phr TiO2, and 2 phr antioxidant. The rubber used in this adhesive was SIR 5L, ground to an average particle size of 8 mm with talc used as an anti-agglomerating agent. The C5 resin was added in flake form and Antioxidant was introduced as a powder. The adhesive raw materials were all added into the feedthroat of a 70 mm PRE. The raw materials were subsequently compounded into an adhesive after being mixed in three 400 mm barrel sections each containing 2 normal and 4 double transversal mixing spindles rotating at 70 rpm. The finished adhesive was determined to be completely homogeneous (gel free). Subsequent molecular weight analysis of the adhesive was completed via gel permeation chromatography (GPC) and thermal field flow analysis (ThFFF). The molecular weight analysis indicated that the natural rubber had been reduced in molecular weight by approximately 80%.

Example 2

|  | Ground Rubber Adhesive |
|---|---|
| Rubber (Kg/hr) | 17.1 |
| Resin (Kg/hr) | 22.2 |
| TiO$_2$, antioxidant (Kg/hr) | 0.7 |
| Solvent (toluene) | 12.0 |
| Screw Speed (rpm) | 65 |
| Adhesive temp, between barrel cylinder 1&2 | 62° C. |
| Adhesive temp, between barrel cylinder 2&3 | 57° C. |
| Adhesive outlet temperature | 42° C. |
| Extruder Residence Time (s) | 90 |
| Adhesive homogeneity | No gels |

A standard carton sealing adhesive was produced with the PRE having three barrel cylinders, represented by 100 phr natural rubber, 130 phr C5 resin, 2 phr TiO$_2$, and 2 phr antioxidant. The rubber used in this adhesive was SIR 5L, ground to an average particle size of 8 mm with talc used as an anti-agglomerating agent. The C5 resin was added in flake form and antioxidant was introduced as a powder. The adhesive raw materials were all added into the feedthroat of a 70 mm PRE. The raw materials were subsequently compounded into an adhesive after being mixed in the first of three 400 mm barrel sections each containing 2 normal and 4 double transversal mixing spindles rotating at 65 rpm. The entire complement of solvent was added via an injection valve inserted into a dosing ring. The finished adhesive was determined to be completely solvated and homogeneous (gel free).

Example 3

|  | Pelletized Natural Rubber | Pelletized Rubber Adhesive |
| --- | --- | --- |
| Rubber and Antioxidant (Kg/hr) | N/A | 14.08 |
| Resin (Kg/hr) | N/A | 15.88 |
| Filler, ZnO, TiO2 (Kg/hr) | N/A | 7.93 |
| Screw Speed (rpm) | N/A | 70 |
| Adhesive temp, between barrel cylinder 1&2 | N/A | 59° C. |
| Adhesive temp, between barrel cylinder 2&3 | N/A | 53° C. |
| Adhesive outlet temperature | N/A | 76° C. |
| Extruder Residence Time (s) |  | 90 |
| Adhesive homogeneity |  | No gels |
| Mw (GPC) | 1,026,671 | 489,279 |
| Percent Drop in Mw |  | 52.3% |
| Mw (ThFFF) | 666,000 | 310,000 |
| Percent Drop in Mw |  | 53.5% |

A standard masking tape adhesive was produced with the PRE having three barrel cylinders, represented by 100 phr natural rubber, 115 phr C5 resin, 50 phr kaolin clay, 5 phr ZnO, 2.5 phr TiO2, and 2 phr antioxidant. The rubber used in this adhesive was SIR 5L, pre-masticated and blended with 2 phr antioxidant in a Banbury and subsequently processed in an underwater pelletizer to yield 8 mm pellets with talc used as an anti-agglomerating agent. The C5 resin was added in flake form, and the ZnO and TiO2 were introduced as powders. The adhesive raw materials were all added into the feedthroat of a 70 mm PRE. The raw materials were subsequently compounded into an adhesive after being mixed in three 400 mm barrel sections each containing 2 normal and 4 double transversal mixing spindles rotating at 70 rpm. The finished adhesive was determined to be completely homogeneous (gel free). Subsequent molecular weight analysis of the adhesive was completed via gel permeation chromatography (GPC) and thermal field flow analysis (ThFFF). The molecular weight analysis indicated that the natural rubber had been reduced in molecular weight by approximately 50%.

Example 4

|  | Pelletized Rubber Adhesive |
| --- | --- |
| Rubber and Antioxidant (Kg/hr) | 14.08 |
| Resin (Kg/hr) | 15.88 |
| Filler, ZnO, TiO2 (Kg/hr) | 7.93 |
| Solvent - Toluene (Kg/hr) | 40.0 |
| Screw Speed (rpm) | 144 |
| Adhesive temp, between barrel cylinder 1&2 | 64° C. |
| Adhesive temp, between barrel cylinder 2&3 | 29° C. |
| Adhesive outlet temperature | 29° C. |
| Extruder Residence Time (s) | 120 |
| Adhesive homogeneity | No gels |

A standard masking tape adhesive was produced with the PRE having three barrel cylinders, represented by 100 phr natural rubber, 115 phr C5 resin, 50 phr kaolin clay, 5 phr ZnO, 2.5 phr TiO2, and 2 phr antioxidant. The rubber used in this adhesive was SIR 5L, pre-masticated and blended with 2 phr antioxidant in a Banbury and subsequently processed in an underwater pelletizer to yield 8 mm pellets with talc used as an anti-agglomerating agent. The C5 resin was added in flake form, and the ZnO and TiO2 were introduced as powders. The adhesive raw materials were all added into the feedthroat of a 70 mm PRE. The raw materials were subsequently compounded into an adhesive after being mixed in the first of three 400 mm barrel sections each containing 2 normal and 4 double transversal mixing spindles rotating at 144 rpm. The solvent was added via injection valves inserted into dosing rings, with 5 kg/hr added into the dosing ring located between barrels 1&2 and 35 kg/hr being added into the dosing ring located between barrels 2&3. The finished adhesive was determined to be completely solvated and homogeneous (gel free).

Example 5

|  | Ground Rubber Adhesive |
| --- | --- |
| Rubber and Antioxidant (Kg/hr) | 14.76 |
| Resin - Feedthroat (Kg/hr) | 8.00 |
| Resin - Sidefeeder (Kg/hr) | 8.64 |
| Filler, ZnO, TiO2 (Kg/hr) | 8.32 |
| Solvent - Toluene - 2/3 (Kg/hr) | 11.0 |
| Solvent - Toluene - 3/4 (Kg/hr) | 29.0 |
| Screw Speed (rpm) | 141 |
| Adhesive temp, between barrel cylinder 1&2 | 120° C. |
| Adhesive temp, between barrel cylinder 2&3 | 60° C. |
| Adhesive temp, between barrel cylinder 3&4 | 33° C. |
| Adhesive outlet temperature | 21° C. |
| Extruder Residence Time (s) | 73 |
| Adhesive homogeneity | No gels |

A standard masking tape adhesive was produced with the PRE having four barrel cylinders, represented by 100 phr natural rubber, 115 phr C5 resin, 50 phr kaolin clay, 5 phr ZnO, 2.5 phr TiO2, and 2 phr antioxidant. The rubber used in this adhesive was SIR 10, ground to an average particle size of 8 mm with talc used as an anti-agglomerating agent. A portion of the C5 resin was added in flake form into the feedthroat of a 70 mm PRE, along with the ZnO and TiO2 powders. The raw materials were subsequently mixed in the first of four 400 mm barrel sections each containing 2 normal and 4 double transversal mixing spindles rotating at 141 rpm. The remaining flake resin was added via a sidefeeder located immediately upstream from the first dosing ring and subsequently mixed in the second barrel section. Solvent was added via injection valves inserted into dosing rings, with 11 kg/hr added into the dosing ring located between barrels 2&3 and 29 kg/hr being added into the dosing ring located between barrels 3&4. The finished adhesive was determined to be completely homogeneous and solvated (gel free).

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A continuous process for preparing an adhesive composition comprising:
   introducing at least one non-thermoplastic elastomer into a planetary roller extruder;
   initially compounding the non-thermoplastic elastomer in the planetary roller extruder to form an initially masticated non-thermoplastic elastomer;
   introducing a solid raw material, a liquid material, or both into the initially masticated non-thermoplastic elastomer in the planetary roller extruder; and
   subsequently compounding the initially masticated non-thermoplastic elastomer with the solid raw material, the liquid material, or both thereof to form an adhesive composition;
   wherein the liquid material is present and comprises a solvent added to the adhesive composition in an amount of about 10% to about 50% by weight.

2. The continuous process of claim 1, wherein the solid raw material has a specific heat that enables the solid raw material to act as a heat sink while subsequently compounding with the initially masticated non-thermoplastic elastomer.

3. The continuous process of claim 1, wherein the solid raw material includes at least one of a thermoplastic elastomer, a tackifier resin, an extender, an activator, an anti-degradant, a crosslinker, an opacifier, and a colorant.

4. The continuous process of claim 3, wherein the solid raw material includes at least one thermoplastic elastomer, and the non-thermoplastic elastomer includes at least one natural rubber, synthetic rubber, or one of both.

5. The continuous process of claim 3, wherein the solid raw material includes at least one thermoplastic elastomer selected from the group consisting of styrene-isoprene-styrene, styrene-butadiene-styrene, styrene-isoprene-butadiene-styrene, styrene-ethylene-butadiene-styrene, styrene-ethylene-propylene-styrene, and combinations thereof.

6. The continuous process of claim 1, wherein the liquid material further comprises at least one of an elastomer, a tackifier resin, an oil, and a plasticizer.

7. The continuous process of claim 1, wherein the solvent comprises at least one non-polar aromatic, one non-polar aliphatic, or a blend thereof.

8. The continuous process of claim 1, wherein the solvent is added in an amount of about 10% to about 20% by weight of the adhesive composition, and the process further comprises applying the adhesive composition to a substrate using a slot-die applicator.

9. The continuous process of claim 1, wherein the solvent is added in an amount of about 10% to about 20% by weight of the adhesive composition, and the process further comprises applying the adhesive composition to a substrate using a reverse roll, roll-over-roll, or knife-over-roll applicator.

10. The continuous process of claim 1, wherein the non-thermoplastic elastomer in the adhesive composition has a molecular weight less than 1,000,000 as measured by GPC.

11. The continuous process of claim 1, wherein the non-thermoplastic elastomer has an initial molecular weight when introduced into the planetary roller extruder and the initial molecular weight is reduced by more than about 50% during the process.

12. The continuous process of claim 1, further comprises:
   introducing a heat-activatable crosslinker into the planetary roller extruder while initially masticating, after initially masticating, or while subsequently masticating the non-thermoplastic elastomer in the planetary roller extruder.

13. The continuous process of claim 12, wherein the heat-activatable crosslinker is selected from the group consisting of an accelerated sulphur or sulphur donor system, an isocyanate system, a reactive melamine resin, a formaldehyde resin, a phenol-formaldehyde resin, a reactive phenolic resin, a diisocyanate system, an epoxidized polyester resin, and combinations thereof.

14. The continuous process of claim 12, wherein the adhesive composition has a final temperature of about 25° C. to about 100° C.

15. The continuous process of claim 12, wherein the activation temperature of the heat-activatable crosslinker is about 110° C. to about 140° C.

16. The continuous process of claim 14, wherein the activation temperature of the heat-activatable crosslinker is about 110° C. to about 140° C.

17. The continuous process of claim 14, wherein the temperature is maintained at about 80° C.

18. The continuous process of claim 13, wherein the heat-activatable crosslinker is the isocyanate system or the diisocyanate system.

* * * * *